United States Patent Office 3,269,019
Patented August 30, 1966

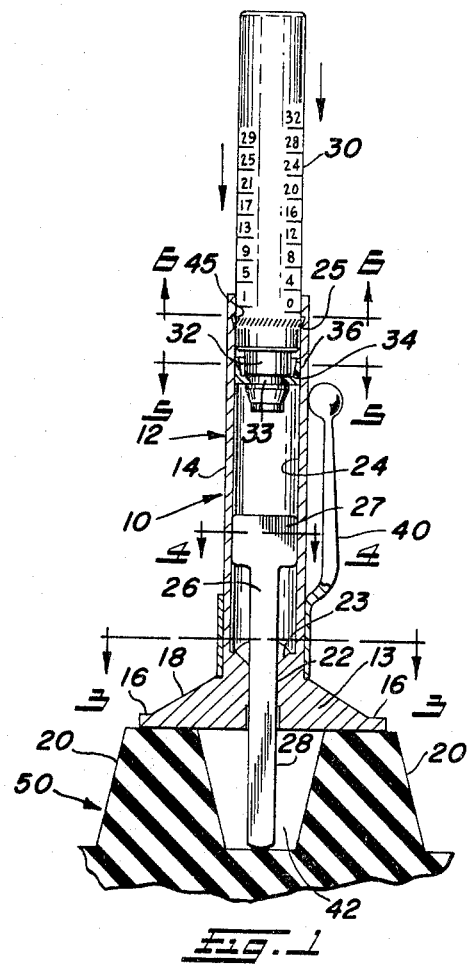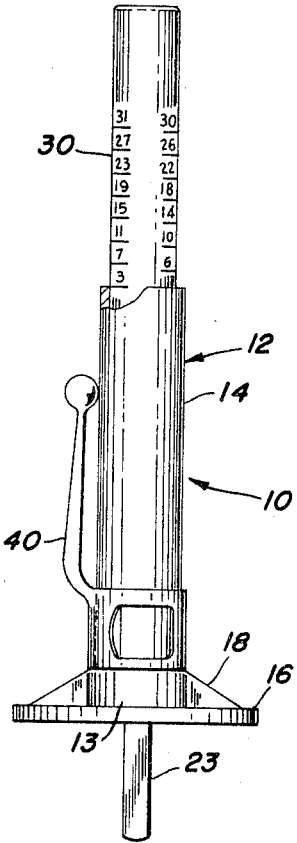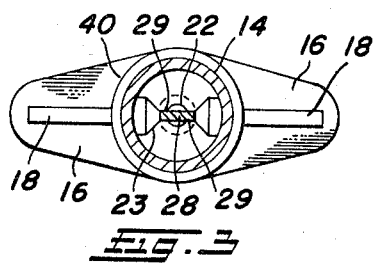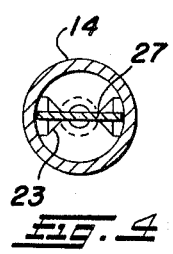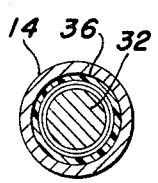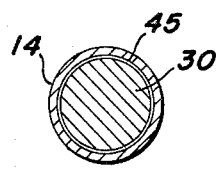

3,269,019
TREAD DEPTH GAUGE
Henry W. Krohn, North Olmsted, Ohio, assignor to Eaton Yale & Towne Inc., a corporation of Ohio
Filed Feb. 16, 1965, Ser. No. 433,072
6 Claims. (Cl. 33—169)

The present invention relates generally to a novel gauge device and more particularly relates to a tire tread gauge which provides readings that are more accurate than the readings available with tread gauges presently available on the commercial market.

Today, with the many tire guarantees and warranties available to the motoring public, it is frequently desirable to determine the depth of tire tread remaining on the tire to properly pro-rate the amount of refund or allowance due to a customer for the unused portion of tread remaining on the tire.

Prior art gauges of this type are known to be very sensitive to handling by the user. Known devices employ a unitary plunger and pin portion, thus it can readily be seen that a slight movement of the gauge, in any direction other than a straight outward movement, may quite possibly cause the gauge to move inwardly or outwardly and thus give a reading which is something other than the true reading of the tread depth. The problem is further compounded by the type of treads found on the tires manufactured today, wherein the grooves are very narrow, thus when the pin portion is inserted into the narrow grooves the pin portion of the gauge is pinched therebetween. As a result of this pinching action, when the gauge is removed from the tire the unitary pin and gauge of known devices moves, thus giving a false reading of the tire tread depth.

An object of the present invention is the provision of a gauge which is simple and relatively easy to manufacture.

Another object of the invention is to provide a tire tread depth gauge which is more accurate than presently available gauges and can be used on tires having extremely narrow tread grooves.

A further object of the invention is the provision of a gauge which has a gauge or indicator member that is independently movable with respect to the depth measuring member.

Another object of the invention is the provision of a body portion of unitary construction providing a base and support means.

Still another object of the invention is to provide means for maintaining the gauge or indicator member in its adjusted position.

Yet another object is to provide means for preventing the removal of the gauge or indicator member from the body portion of the gauge.

Other objects and many of the attendant advantages of this invention will be readily appreciated as the same becomes better understood by reference to the following detailed description when considered in connection with the accompanying drawings wherein:

FIGURE 1 is an elevation view, partially in section, illustrating the manner of use of the device.

FIGURE 2 is another elevation view, partially in section, illustrating the gauge in its retracted position.

FIGURE 3 is a sectional view taken on the line 3—3 of FIGURE 1.

FIGURE 4 is a sectional view taken along the line 4—4 of FIGURE 1.

FIGURE 5 is a sectional view taken along the line 5—5 of FIGURE 1.

FIGURE 6 is a sectional view taken along the line 6—6 of FIGURE 1.

Referring now to the drawings wherein like reference characters designate like or corresponding parts throughout the several views, there is shown in FIGURE 1 a tire tread depth gauge 10 as being employed to check the depth of the tread ribs 20 of a tire 50.

As illustrated in FIGURE 1, which shows an enlarged tire tread section, the depth gauge 10 is provided with a unitary body member 12 having a base portion 13 and cylindrical portion 14. The base portion 13 is provided with a pair of extensions 16 that extend perpendicularly to cylindrical portion 14 and are of sufficient width to bridge the ribs 20 of tire 50. The extensions 16 are strengthened by means of two web supports 18. These web supports 18 are integrally connected at opposite ends with cylindrical portion 14 and extension 16. Centrally located within base portion 12 and at the bottom of the cylindrical portion 14 is an aperture 22 which extends completely through the base portion 13. The aperture 22 is tapered at 23 for reasons to be explained hereinafter.

The inner wall 24 of cylindrical portion 14 is provided with an annular detent 25 which serves as a restraining means for the gauge member 30. The annular detent 25 consists of a tapered portion tapering inwardly into the wall 24 and terminates in an outwardly extending shoulder 45. This annular detent 25 may be formed in any suitable manner, perhaps most efficiently in the casting of body member 10. The manner in which annular detent 25 functions to restrain the gauge member 30 will be fully explained below.

Mounted for axial movement within the cylindrical portion 14 as a tread depth measuring member 26 which consists of a head portion 27 that is of substantially the same width as the diameter of the inner wall 24 of the cylindrical portion 14. Depending from head portion 27 is an elongated feeler portion 28 which is inserted into aperture 22. Taper 23 on aperture 22 assists in the insertion of feeler portion 28 into aperture 22. The aperture 22 is channeled at 29, as shown in FIGURE 3, to serve as a guide means for feeler portion 28. It can readily be seen that channels 29 will considerably strengthen the feeler portion 28. The underside of head portion 27 will come into abutment with the bottom of cylindrical portion 14 and thus prevent further extending movement of feeler portion 28 relative to base portion 13.

Also mounted for axial movement within the cylindrical portion 14 and in spaced relation to the depth measuring member 26 is gauge or indicator member 30. The lower end 32 of gauge member 30 is of lesser diameter than the remainder of gauge member 30. Located adjacent the lowermost end of the lower end is an annular groove 33. Mounted on the lower end 32 within annular groove 33 is a combined friction and restraining member 34. This annular member 34 is made of polyethylene, or any other suitable material, and has a base diameter which is substantially the same as the inner diameter of cylindrical portion 14. This annular member 34 is provided with an outwardly flaring skirt 36 when in its unrestricted form. However, when gauge member 30 is inserted into cylindrical portion 14 the skirt 36 of annular member 34 is brought into intimate contact with the inner wall 24 of cylindrical portion 14. It can thus be seen that member 34 provides a yielding frictional engagement with the inner wall 24 which is sufficient to hold the gauge member 30 in a set position within cylindrical portion 14.

As the gauge member 30 is withdrawn from the cylindrical portion 14 the outermost end of skirt 36 flares outwardly and engages annular detent 25 thus preventing the gauge member 30 from being completely removed from cylindrical portion 14. The outer cylindrical surface of gauge member 30 is scribed in increments of one thirty-secondth of one inch. The uppermost portion of cylindrical portion 14 is aligned with the markings on the outer surface of gauge member 30 and the depth of the groove or tread may be read directly therefrom by reading the number of the line which most nearly coincides with the uppermost edge of the cylindrical portion 14. As can readily be seen, the graduations are scribed in gauge member 30 in the form of a spiral with the graduations spaced one thirty-second of one inch apart. Thus, the gauge 10 is rotated until the user observes the line which most accurately is aligned with the uppermost edge of cylindrical portion 14.

Attached to the outer cylindrical portion 14 adjacent the base portion 13 is a spring clip 40 which serves as a convenient attachment means for carrying the gauge 10 in the pocket of the user.

FIGURE 2 illustrates the gauge 10 as being removed from the tread of tire 50 permitting a reading to be taken. The relationship of the uppermost end of cylindrical portion 14 and gauge or indicator member 30 is utilized as the reading line from which a reading may be taken on the outer surface of gauge member 30. The cutaway portion illustrates the manner in which a reading is taken from the gauge member 30.

Referring now to FIGURE 3, there is more clearly shown the taper 23 at opposite sides of the channel portion 29 thus permitting the feeler portion 28 to be easily inserted into the channel 29. There is also shown at 18 the web supports which provide the necessary support between the base extensions 16 and the cylindrical portion 14.

FIGURE 4 which is a cross-sectional view taken upon the line 4—4 of FIGURE 1 clearly illustrates the relationship of the head portion 27 of the depth measuring member 26 with respect to the inner wall 24 of cylindrical portion 14. As can readily be seen, the feeler portion 28 of the depth measuring member is stamped from commercially available stainless steel stock or any other suitable material. Feeler portion 28 is inserted into the cylindrical portion 14 with sufficient clearance therebetween to permit the depth measuring member to slide freely within cylindrical portion 14 while at the same time maintaining the depth measuring member 26 in a substantially vertical position.

Referring now to FIGURE 5, which is a cross-sectional view taken along the line 5—5 of FIGURE 1, there is shown the combined friction and restraining member 34. Here it can readily be seen that the member 34 is in frictional contact with the inner wall 24 of the cylindrical portion 14. Thus, the member 34, due to the wide area of contact with inner wall 24 provides stability to the gauge or indicator member 30 and thereby retains the member 30 in its set position. As pointed out previously, skirt 36 has a tendency to move radially outwardly thereby providing the desired degree of stability and rigidity of member 30.

In viewing FIGURE 6, the depth of the annular detent 25 may be observed. As pointed out previously, when the gauge member 30 is extended sufficiently, the resiliency of the combined friction and restraining member 34 will permit the skirt portion 36 to flare radially outwardly, thus preventing further outward movement of the gauge member 30 due to the engagement of skirt 36 with the annular detent 25.

Perhaps at this point a complete explanation of the manner of using the subject depth gauge would be helpful, such is the following:

The gauge 10 is placed over the tread of the tire to be checked with the base extensions 16 bridging the valley portion 42 of the tire. Having done this, a finger is placed on the outermost end of gauge member 30 and a downward force is exerted thereon in the direction of the arrows illustrated in FIGURE 1. The gauge member 30 will travel downwardly until the lowermost end thereof comes into abutment with the uppermost end of depth measuring member 26. At this point the gauge 10 may be removed from contact with the tire. It is to be noted that as the gauge 10 is removed, the depth measuring member 26 will move independently with respect to the gauge member 30 and move out of contact therewith. It can thus be seen that if the depth measuring member 26 was accidentially brought into contact with the tire or some other object after a measurement has been taken it would have no effect on the position of the gauge member 10 and thus provide a true reading of the tread depth. Obviously, if the gauge or indicator member 10 was brought into hard downward contact with an object it would overcome the friction of member 34 and possibly alter the reading. However, normal use of the gauge 10 would not present this problem. It is also to be noted that the relatively firm position of gauge member 30 in body member 12 is due in no small measure to the novel combined friction and restraining member 34. The height of the member 34 combined with the outwardly flared skirt portion provides a contact area of sufficient strength to prevent any undesired movement of the gauge or indicator member 30. Once the gauge 10 is removed from contact with the tire, the reading of the depth may be taken by reading the figure on outer surface of gauge member 30 which most nearly aligns itself with the uppermost edge of cylindrical portion 14.

It can thus be seen that applicant has provided a simple, accurate gauge which has a depth measuring member that is independently moveable with respect to the gauge or indicator member. It is made of parts which are designed to provide accurate and lasting use. As pointed out earlier in the specification, this device is described as a gauge for measuring the depth of tread remaining on the tire. However, it is not intended that applicant be restricted to this particular use.

Obviously, many modifications and variations of the present invention are possible in the light of the above teachings. It is therefore to be understood that within the scope of the appended claims, the invention may be practiced otherwise than as specifically described.

Having thus described my invention, I claim:

1. A tire tread depth gauge comprising a body member having a base portion with an aperture extending therethrough, said body member having an elongated hollow portion extending upwardly from said base portion, detent means associated with the upper end of said hollow portion, first movable means mounted within said hollow portion and extending through said aperture in said base portion, said first movable means comprising a depth measuring member having an upper portion of substantially the same width as said hollow portion and a lower elongated feeler portion of reduced width, second movable means mounted within said hollow portion above said movable means, said first and second movable means being independently movable relative to each other, and restraining means fixedly secured to the lower end of said second movable means, said restraining means cooperating with said elongated hollow portion to hold said second movable means in adjusted position relative to said hollow portion and further cooperating with said detent means to prevent said second movable means from being completely withdrawn from said hollow portion whereby said second movable member may be moved inwardly until it stops and said second movable means provides an indication which is representative of the depth of the void being measured.

2. In a tire tread depth gauge of the character described in claim 1 wherein said detent means comprises an annular groove in the inner wall of said hollow portion, said annular groove tapering inwardly into said inner wall to a point of maximum depth and terminating in a shoulder at this point.

3. In a tire depth gauge of the character described in claim 1 wherein said second moveable means comprises a gauge member having a lower end which receives said restraining means and its upper portion is provided with graduations on its outer surface.

4. A tire tread depth gauge comprising a body member having a base portion and an elongated upwardly extending hollow cylindrical portion, a centrally located aperture extending through said base portion, guide means in said base portion associated with said centrally located aperture, detent means on the inner wall of said cylindrical portion located in close proximity to the uppermost end of said cylindrical portion, depth measuring means extending through said aperture in said base portion and movably mounted within said cylindrical portion, said depth measuring means comprising a member having an upper portion of substantially the same width as the inner diameter of said cylindrical portion, said depth measuring means having an elongated feeler portion of reduced width depending from said upper portion, indicating means extensibly mounted above said depth measuring means and within said cylindrical portion, said indicating means being of slightly less diameter than the inner diameter of said cylindrical portion and having a reduced diameter portion at the lower end thereof, combined friction and restraining means fixedly secured to said reduced diameter portion of said indicating means, said indicating means having graduations upon its outer cylindrical surface, whereupon inserting said depth measuring means into the tread of the tire and applying a force to the outermost end of said indicating means, said depth measuring means is engaged by said indicating means upon movement of said indicating means inwardly, said indicating means and said depth measuring means moving as a unit until said depth measuring means contact the bottom of the void being measured whereby a reading representative of the tire tread depth may be taken from the outer cylindrical portion of said indicating means.

5. In a device of the character described in claim 4 wherein guide means is formed by a pair of oppositely spaced channels with the opening of said channels bordering on the periphery of said centrally located aperture, said channels extending the full length of said aperture.

6. In a device of the character described in claim 4 wherein said detent means comprises an annular groove in the inner wall of said cylindrical portion, said annular groove tapering inwardly into said inner wall to a point of maximum depth and terminating in a shoulder at this point and said friction and restraining means comprises a cup member having a base diameter substantially equal to the inner diameter of said cylindrical portion and an outwardly flaring skirt portion in frictional contact with the inner wall of said cylindrical portion.

References Cited by the Examiner

UNITED STATES PATENTS

| | | | |
|---|---|---|---|
| 1,422,278 | 7/1922 | Low | 73—396 |
| 1,922,758 | 8/1933 | Christopherson | 33—170 |
| 2,619,727 | 12/1952 | Krohn | 33—172 |
| 2,758,383 | 8/1956 | Breit | 33—170 X |

LEONARD FORMAN, *Primary Examiner.*

ROBERT B. HULL, *Examiner.*

B. DONAHUE, *Assistant Examiner.*